Feb. 20, 1968 J. G. SVRCHEK 3,369,922
METHOD FOR APPLYING HEAT REACTIVE COATINGS
Filed Aug. 9, 1966
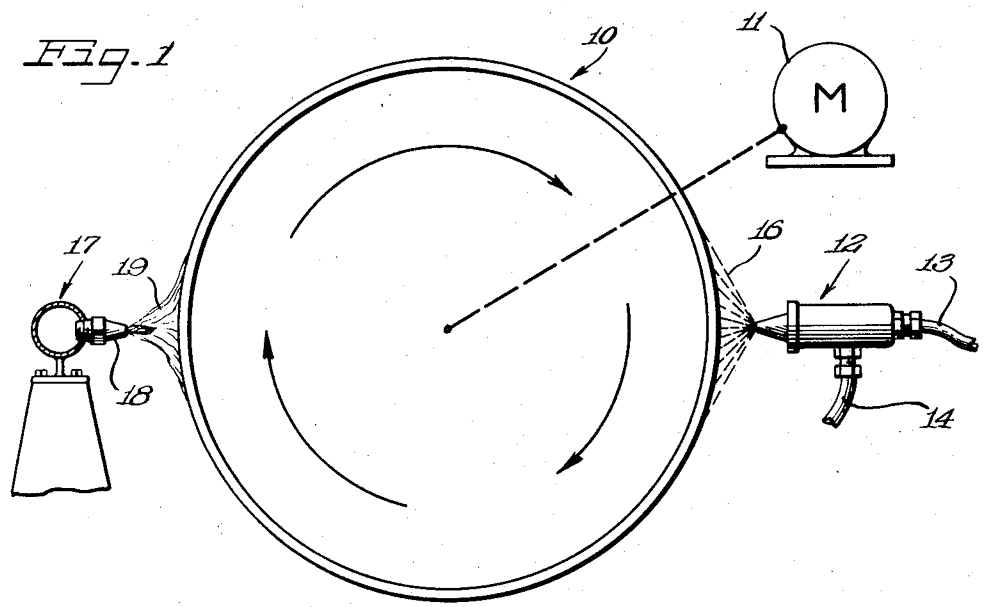
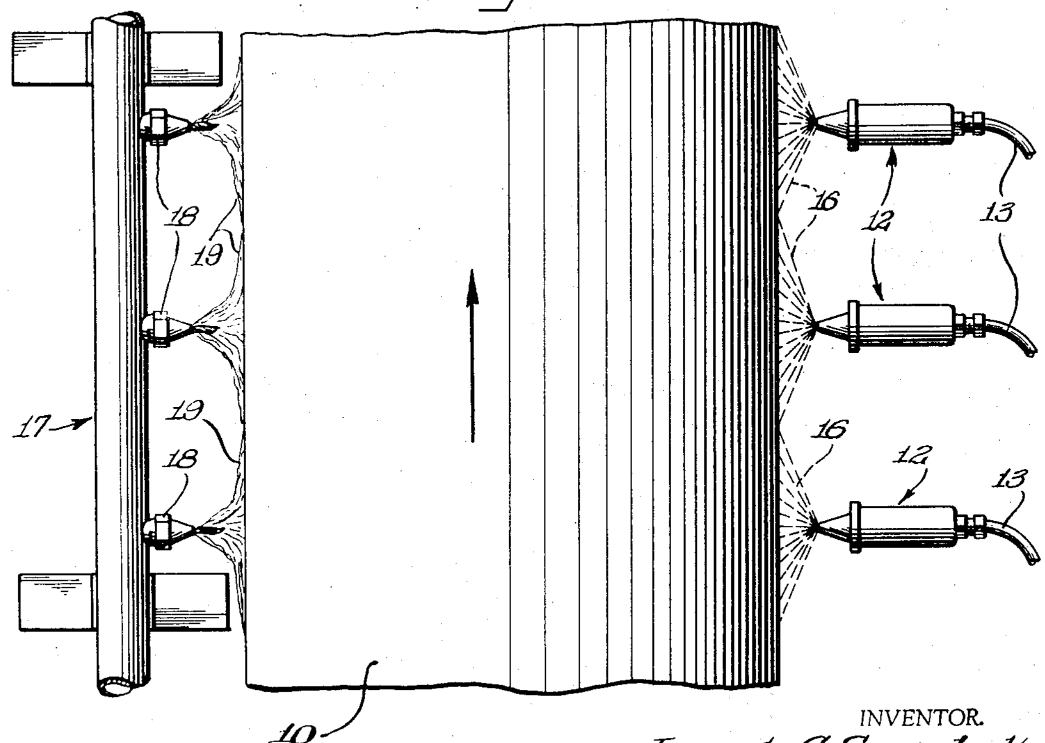
INVENTOR.
Joseph G. Svrchek
BY
Kenneth E. Prince
ATTORNEYS

United States Patent Office 3,369,922
Patented Feb. 20, 1968

3,369,922
METHOD FOR APPLYING HEAT REACTIVE COATINGS

Joseph G. Svrchek, 330 N. Park Road, La Grange Park, Ill. 60525

Continuation-in-part of application Ser. No. 255,441, Feb. 1, 1963. This application Aug. 9, 1966, Ser. No. 571,202
6 Claims. (Cl. 117—47)

ABSTRACT OF THE DISCLOSURE

Method of coating pipe comprising continuously rotating a preheated pipe about its axis while spraying a heat sensitive resinous coating composition on the pipe's surface to coat the pipe, and heating the thus coated pipe at a temperature which will cure and immobilize the coating by rotating the coated surface through a heating zone, the coating applied per revolution or pass having a thickness not exceeding about 0.43 mil, continuing the sequence of spraying and heating until the surface is coated to a thickness of at least about 4.5 mils, and thereafter cooling to cause the coating to become hardened, all as described hereinafter.

This is a continuation-in-part of copending patent application Ser. No. 255,441, filed Feb. 1, 1963, and now abandoned.

The present invention relates to an improved method and apparatus for applying reactive coatings to surfaces, and particularly to the application of protective coatings for pipe.

In summary, this invention is directed to a method of applying a liquid heat sensitive resinous coating composition to a pipe surface which comprises preheating the pipe to a temperature sufficient to promote setting of the resinous components in said composition, rotating said pipe about its axis, spraying a film of said composition of a thickness not in excess of about 0.43 mil onto a portion of the periphery of said pipe, heating the coated pipe while the coating is still liquid at a temperature sufficient to immobilize the coating thereon, but insufficient to set the coating into a completely hard form, continuing the sequence of spraying and heating until the periphery of the pipe is coated with a coating measuring at least about 4–4.5 mils in thickness, and thereafter cooling the coating to cause the coating to become hardened.

In a preferred embodiment of this invention, I apply a heat reactive coating composition including a butadiene-styrene copolymer containing from 75 to 85% butadiene and 15 to 25% styrene and a volatile solvent to a pipe which comprises preheating said pipe to a temperature in the range from 250° to 450° F., rotating said pipe about its axis, spraying a film of said composition not in excess of about 0.43 mil in thickness to a portion of said pipe, heating the coated pipe at its outer surface to a temperature of at least 250° F. but below the temperature at which the coating carbonizes to thereby volatilize off the solvent and accelerate the setting of the copolymer into a coating which is highly viscous, and continuing rotation of the pipe and spraying and heating of the copolymer until a coating is built up measuring at least 5 mils in thickness.

In the drawings:

FIG. 1 is a side elevational view of the apparatus of the instant invention.

FIG. 2 is a plan view of a typical apparatus.

Probably the most prevalent method for protecting pipe which is to be buried underground involves the application of hot coatings such as coal tar pitch, asphalt, or wax to the surface of the pipe prior to laying it in the ground. While these coatings are relatively inexpensive raw materials, a substantial amount of labor is involved in applying them to the pipe and then the protection which they afford is not as great as would be desired. The chemical and electrical properties of such coatings on pipe are not completely satisfactory, and corrosion of the pipe occurs with sufficient frequency that this method of pipe protection is still less than wholly satisfactory. Hot applied coatings are also liable to damage during transport and to damage by backfill materials used on the job site. The coatings are also subject to damage by bending of the pipe prior to laying, and are subject to disbonding because of weather extremes or soil stresses.

One of the best methods for applying a completely resistant coating to pipe has been described in U.S. Patent No. 3,028,257. Said patent describes the application of heat reactive polymers to surfaces and involves spraying a heat reactive, partly polymerized copolymer with a flammable liquid diluent at a temperature above the flash point of the diluent to atomize the coating composition, whereupon the resulting spray is directed through an envelope of flame and heat directed at the surface to be coated. While in this zone, the polymerization of the copolymer continues at a rapid rate so that shortly after application to the surface in the form of a continuous film, the copolymer is completely set to an infusible coating which is completely resistant to attack by chemicals, soil bacteria, and electrolytic corrosion.

The process of the aforementioned patent has been successfully applied to miles of large diameter pipe at an overall cost comparable to the cost of hot applied coating-wrapping systems. It has now been found that the cost of application of the heat sensitive resins can be further reduced by the process of the present invention. These economies are effected by increasing the efficiency of application while retaining most of the desirable properties in the finished coating. In the process of the previously mentioned patent, some of the resin was unavoidably lost by burning in passing through the envelope of flames and heat. With the new process, significant savings in material can be effected since the spray pattern is applied without passing it through a flame zone.

An object of the present invention is to provide an improved method for the application of heat sensitive, resinous coating compositions to pipe surfaces.

A further object of the invention is to provide a method for the application of heat reactive, thermosetting resins to pipe surfaces to effect savings in the amount of resin applied, while still building up a satisfactorily thick coating.

A further object of the invention is to provide an apparatus for the application of heat reactive, thermosetting coatings in a rapid and efficient manner.

Another object of the invention is to provide a method for putting down many chemically bonded coatings consecutively, with intermediate heat treatment, thereby reducing the possibility of defects in the overall coating.

A further object of the invention is to provide an apparatus for applying very thin multiple films of a heat reactive copolymer to the surface of a pipe, and continuously setting the material on the pipe until a satisfactory thickness of the cured coating is built up.

The present invention can be employed with many different types and combinations of thermosetting resinous compositions, provided they can be put into a form in which they can be applied as a thin film onto the surface of a pipe. Among the numerous resins which can be used are the phenolic condensation products, epoxy resins, urea-formaldehyde resins and the like. A particularly preferred class of resins for use in this process are the thermosetting polymers based on butadiene such as polybutadienes, epoxidized polybutadienes and butadiene-styrene copolymers which contain from about 75 to 85 parts butadiene and from 15 to 25 parts (by weight) styrene.

Some attempts have been made in the past to apply the heat reactive butadiene-styrene copolymers onto the surface of a metal by spraying, brushing, or the like followed by application of a flame to the coating to complete the copolymerization reaction. Unless extremely carefully controlled, most of these attempts ended in the production of unsuccessful coatings largely because solvent was trapped within the resinous coating and upon setting of the resinous components, the solvent formed blisters which rendered the coating unsatisfactory.

I believe that one of the principal reasons that such techniques have failed lies in the attempt to put down too thick a coating in each pass. The butadiene-styrene copolymers are excellent heat insulators and it is practically impossible to finish curing a coating of a few mils or so, with complete removal of solvent, in the times that have heretofore been allotted. Furthermore, prior attempts may have been unsuccessful because the coating layers deposited subsequently did not bond properly to the underlying layers, so that the multilayer coating was subject to delamination.

In accordance with the present invention, the coating thickness applied at each pass (i.e., per revolution of the pipe being coated) is extremely small, and the other variables are so controlled that each film of copolymer which has been applied to the surface of the pipe is partly cured with complete elimination of the solvent before the next thin film is applied, but the film remains receptive to the next applied film. In the practice of the present invention, I have found that 0.43 mil (0.00043 inch) is substantially the upper limit of thickness of the coating which can be applied per pass (i.e., per revolution of the pipe) since my work has shown that a per pass thickness of 0.46 mil is inoperable. Usually the thickness of coating applied per pass where practicing this invention is less than about 0.1 mil. However, I have also obtained excellent results with a thickness per pass (i.e., per revolution) of about 0.21, 0.23, 0.26, 0.34, and 0.41 mil. Per pass (per revolution) thicknesses of about 0.46 mil and greater have given unacceptable coatings (e.g., coatings containing many fragile bubbles and numerous "pin holes"); such thicknesses are inoperable. I have also found that the aforementioned sequence of spraying and heating the rotating pipe should be continued until the periphery of said pipe is coated with a coating measuring at least about 4–4.5 mils and preferably at least about 5 mils in thickness because thinner coatings sometimes fail in service.

In accordance with the present invention, the pipe to be coated is preheated to a temperature sufficient to promote setting of the resinous components in the composition. In the case of the aforementioned butadiene-styrene copolymers, the preheating range usually extends from about 250 to 550° F. This range will vary, of course, with the type of copolymer being applied. The pipe or other object to be coated is continuously rotated during the application of the thin resinous film and usually moved axially as well. The amount of material being applied to the pipe and the speed of rotation of the pipe are adjusted so that the resulting film does not exceed a thickness of substantially 0.43 mil. The coated pipe, in its rotation, carries the still wet coating to a curing station with sufficient velocity so that the coating is still wet when it is subjeced to the heat at the curing station. Some additional polymerization undoubtedly occurs in transit from the applicator station to the curing station because of the substantial temperature to which the pipe has been preheated. However, this small degree of reaction is not harmful and is indeed beneficial since it initiates the setting reaction which is brought close to completion in the curing station.

At the curing station, sufficient heat is applied to the coated pipe to transform the thin film of the coating into a tacky, viscous semi-solid which is immobile on the pipe but still has not reached the point of complete solidification. For the butadiene-styrene copolymers, this means heating the coating to a temperature of at least 250° F., and preferably not in excess of about 500° F. At substantially higher temperatures, carbonization of the coating is likely to occur.

The heating of the thin film of coating in the manner described, both from the heat retained in the pipe and the heat applied exteriorly is sufficient to completely volatilize any solvent present and leave a coating which still has reactive sites for bonding with subsequently applied coatings. Then, as the pipe is continuously rotated, an additional thin layer of resinous composition is applied, bonding itself to the reactive sites, and the process is repeated until a coating of at least several mils thickness (usually about 4–4.5, or 5 mils, or more) is built up on the pipe.

The butadiene-styrene copolymers containing about 75 to 85 parts butadiene and 15 to 25 parts styrene can be prepared in a number of manners including reaction of the monomers in the presence of sodium. The copolymers may contain hardness modifying agents such as maleic acid, fumaric acid, thioglycolic acid, thiosalicylic acid, mercaptophthalic acid, itaconic acid, mesaconic acid, citraconic acid, acrylic acid or esters thereof in small amounts. They may also contain small amounts of alkylated phenols, or other promoters. The copolymers may also contain modifiers such as acrylic nitriles, alkyl acrylates, vinyl acetate, vinyl ketones, cinnamaldehyde, thiglycolic acid, and the like. The copolymers may contain bodying agents such as maleic anhydride.

Suitable solvents for the butadiene-styrene copolymers in their incompletely polymerized form include alkanols such as 2-propanol and ethanol, petroleum naphthas having a boiling range of about 90° to 120° C., straight run mineral spirits having a boiling range of about 150° to 200° C., or hydrocarbons such as butane, pentane, benzene, toluene, xylene, cyclohexane, butenes, pentenes, or the like, alone or in admixture. Generally, the solvent is added in sufficient amount to provide a consistency suitable for the type of application which is to be used. As a general rule, for spraying purposes, the solvent will be present in amounts of about 50 to 150 parts by weight for every 100 parts by weight of the incompletely copolymerized solids.

The butadiene-styrene copolymers described above are commercially available drying oils sold under the trademark "Buton." As described in U.S. Patent No. 2,762,851, and others, the butadiene and styrene may be copolymerized in the presence of sodium in a reaction diluent such as an aliphatic hydrocarbon at temperatures ranging from about 25° to 95° C. Color properties may be improved by the addition to the diluent of an aliphatic ether or polyether such as dioxane-1,4 in amounts of from 10 to 45 parts per 100 parts of the monomers.

The commercial product is a liquid—apparently a solution of polymeric drying oil in a hydrocarbon solvent—having a viscosity ranging broadly from 0.5 to 20 poises at a 50% nonvolatile matter content. The Staudinger molecular weight of the polymeric constituents varies from about 2000 to 1000 corresponding to an intrinsic viscosity of about 0.15 to 0.4 or 0.6.

A further description of the present invention will be made in conjunction with the attached sheet of drawings which illustrates, in a somewhat diagrammatic fashion, the method and apparatus of the present invention.

Reference numeral 10 indicates generally a pipe to be coated, the pipe being rotated on its axis by means of a motor diagrammatically illustrated at reference numeral 11. A battery of spray guns 12 having feed lines 13 for introducing the resinous composition and lines 14 for introducing compressed air to apply a spray 16 to the periphery of the pipe during its rotation. For purposes of safety, there should be a substantial amount of atomizing air so that the concentration of flammable solvent never reaches the explosive limit, and the atomizing air provides a cooling effect on the spray to keep it below the ignition temperature. The pipe 10 is preheated prior to the application of the spray 16 to a temperature sufficient to promote setting of the particular resinous components which are present in the spray. The material deposited by the spray gun 12 is a continuous thin film measuring not in exces of about 0.43 mil in thickness. As the film forms on the exterior of the pipe 10, the polymerization reaction commences by virtue of the preheat which has been given to the pipe. Nevertheless, the applied thin film is still liquid by the time it reaches a curing station generally identified at reference numeral 17 in the drawings. Here, a source of heat such as a battery of nozzles 18 issue flames 19 which play on the surface of the wet coating to eliminate completely the solvent present and to advance the polymerization reaction further. As mentioned previously, the temperature to which the coating is raised in the curing step should be at least 250° F. for the butadiene-styrene type copolymer, but below the temperature at which carbonization would occur. Suitable heat sources include burners utilizing oxy-acetylene, natural gas-air, propane-oxygen, and the like. Non-flaming heaters may also be used, but better physical properties are achieved in the coating when the films are exposed to a naked flame.

When the coated portion of the pipe leaves the zone of heat provided by the curing station 17, the coating is immobile, but tacky and viscous, and completely devoid of solvent. It is then ready for another application of the liquid coating from the spray guns 12 or other applicator means. Successive applications of the thin film are then partially cured at the curing station and the required coating thickness is built up progressively. After the coated pipe has moved axially out of the curing station and applicator zone the coating sets to a completely solid, hard coat. If desired, the final setting may be accelerated by quenching the coating in a water bath.

As evident from the foregoing, it is necessary to control the various variables in the process in order to secure the best results. The rate of rotation of the pipe 10 and the amount of material issuing from the spray gun 12 should be closely adjusted so that the material is applied in the form of a thin film, but a substantially continuous one. The velocity of the periphery of the pipe can vary widely, with ranges of about 10 to 500 feet per minute being typical.

The ability to lay down very thin films of liquid heat sensitive material, and to build up a substantial coating thickness from superimposing a large number of such films is at least partially attributable to the manner in which the film is heated. The spray is initially deposited upon a heated pipe which initiates the completion of the polymerization in the thin, substantially continuous film. Then, when the film comes within the heated zone provided by the curing station, the polymerization reaction or the setting reaction is substantially accelerated, because the film is being heated from both sides in this zone. Any solvent that has been trapped in the film tends to migrate from the inside edge of the film to the outside because the heat is applied initially from the inside of the film. The solvent is, therefore, completely volatilized by the time the film has left the curing station and the film is in condition to receive a new film deposit.

While the drawings illustrate the process as applied to the exterior coating of pipe, it should be recognized that the process may be employed for the internal coating of large diameter pipes as well.

It should be evident that various modifications can be made to the described embodiments without departing from the scope of the present invention.

As used herein, the term "percent" (%) means percent by weight, unless otherwise defined where used, and the term "parts" means parts by weight, unless otherwise defined where used. One mil is 0.001 inch.

This invention is further illustrated by the following examples which are illustrative only and which do not limit the scope of the invention.

*Example I*

The material to be sprayed was a liquid butadiene-styrene drying oil composition having the following physical properties:

| Property | Value |
|---|---|
| Non-volatile copolymer content ________percent__ | 51.7 |
| Solvent—"Solvesso 100" (mixture of xylenes and toluene) ________percent__ | 34.1 |
| Isopropyl alcohol ________do____ | 10.5 |
| Pigment ________do____ | 3.6 |
| Specific gravity of solution ________ | 0.957 |
| Viscosity, No. 4 Ford cup, 75° F. _____seconds__ | 134 |

A three inch pipe was preheated to a temperature of 350° F. before applying coating resin (i.e., the aforesaid butadiene-styrene drying oil) and rotated at the rate of about 200 r.p.m. (revolutions per minute) while applying the resin. The aforesaid composition was sprayed onto the pipe surface as a continuous film, the rate of resin application was such that the film deposited per revolution measured less than 0.1 mil in thickness. A curing flame derived by the combustion of acetylene was played on the surface of the pipe about 180° from the spray station.

The coating was heated at the curing station to an estimated temperature of 400° F. The thus coated pipe was cooled to ambient temperature (i.e., ca. 75° F.). A coating build up of about 7 mils resulted; this coating cured excellently and had a pencil hardness of 6H, i.e., it resisted penetration by a 6H pencil, successfully resisted impact by a ball peen hammer and was free of bubbles and "pin holes."

*Example II*

The general procedure of Example I was repeated; however, in this instance the pipe was preheated to a temperature of about 400° F., and the rate of rotation was about 28 r.p.m. The rate of resin application was such that a film having a thickness of about 0.21 mil was deposited per revolution. A coating build up of about 6 mils resulted. This coating cured excellently; it successfully resisted impact by a ball peen hammer, and it was free of bubbles and "pin holes."

*Example III*

The general procedure of Example II was repeated, but in this instance the pipe was rotated at about 21 r.p.m. and the rate of resin application was such that a film having a thickness of about 0.34 mil was deposited per revolution. A coating build up of about 7 mils resulted. This coating cured excellently; it resisted impact by a ball peen hammer and was free of bubbles and "pin holes."

*Example IV*

The general procedure of Example II was repeated, but in this instance the pipe was rotated at about 11 r.p.m. and the rate of resin application was such that a film having a thickness of about 0.41 mil was deposited per revolution. A coating buildup of about 4.5 mils resulted. This coating cured excellently; it resisted impact by a ball peen hammer, and it was free of bubbles and "pin holes."

*Example V*

The general procedure of Example II was repeated, but in this instance the rate of resin application was such that a film having a thickness of about 0.46 mil was deposited per revolution. A coating build up of about 4.6 mils resulted. This coating had a "frothy" appearance; numerous bubbles were present in this coating which also had a large number of "pin holes." Said coating was unacceptable, thereby showing that a rate of application of resin which will deposit a film thickness of 0.46 mil per revolution is inoperable.

*Example VI*

The general procedure of Example II was repeated, but in this instance the pipe was rotated at about 6½ r.p.m. and the rate of resin application was such that a film having a thickness of about 0.9 mil was deposited per revolution. A coating build up of about 6 mils resulted. This coating was "forthy" in appearance and had hundreds of bubbles and "pin holes." This coating was unacceptable.

What is claimed is:

1. The method of applying a liquid heat sensitive resinous coating composition to a pipe surface which comprises preheating the pipe to a temperature sufficient to promote setting of the resinous components in said composition continuously rotating said pipe about its axis, spraying a film of said composition onto a portion of the periphery of said pipe to coat the pipe, heating the thus coated pipe while the coating is still liquid at a temperature sufficient to immobilize the coating thereon, but insufficient to set the coating into a completely hard form, said coating, as applied per pass, having a thickness not in excess of about 0.43 mil, and continuing the sequence of spraying and heating until the periphery of the pipe is coated with a coating measuring at least about 4.5 mils in thickness, and thereafter cooling the coating to cause the coating to become hardened.

2. The method of applying a heat reactive coating composition including a butadiene-styrene copolymer containing from 75 to 85% butadiene and 15 to 25% styrene and a volatile solvent to a pipe which comprises preheating said pipe to a temperature in the range from 250° to 450° F., rotating said pipe about its axis, spraying a film of said composition not in excess of about 0.43 mil in thickness to a portion of said pipe, heating the coated pipe at its outer surface to a temperature of at least 250° F. but below the temperature at which the coating carbonizes to thereby volatilize off the solvent and accelerate the setting of the copolymer into a coating which is highly viscous, and continuing rotation of the pipe and spraying and heating of the copolymer until a coating is built up measuring at least 5 mils in thickness.

3. The method of claim 1 in which said coating composition includes an incompletely polymerized butadiene-styrene copolymer.

4. The method of claim 1 in which said coating composition includes an incompletely polymerized butadiene-styrene copolymer and a volatile solvent.

5. The method of claim 1 in which the coating measures at least about 5 mils in thickness.

6. The process of claim 1 in which:

(a) the heat sensitive resinous coating composition is a butadiene-styrene copolymer containing from 75 to 85 parts butadiene and from 15 to 25 parts styrene;

(b) the pipe is preheated to a temperature in the range from 250° to 550° F.;

(c) the pipe is rotated about its axis with the velocity of the periphery of the pipe being about 10 to 500 feet per minute;

(d) the coated pipe is heated to 250–500° F.; and (e) the sequence of spraying and heating is continued until the periphery of the pipe is coated with a coating measuring at least about 5 mils in thickness.

References Cited

UNITED STATES PATENTS

| | | | |
|---|---|---|---|
| 1,978,415 | 10/1934 | Collins | 117—105.4 X |
| 2,963,045 | 12/1960 | Canevari et al. | 117—46 X |
| 2,974,364 | 3/1961 | Lambert et al. | 18—15 X |
| 3,009,209 | 11/1961 | Weinbrenner et al. | 264—309 X |
| 3,028,257 | 4/1962 | Svrchek et al. | 117—46 |
| 3,108,022 | 10/1963 | Church | 117—18 X |

RALPH S. KENDALL, *Primary Examiner.*

ALFRED L. LEAVITT, *Examiner.*

E. B. LIPSCOMB III, *Assistant Examiner.*